(12) United States Patent
Wang et al.

(10) Patent No.: US 12,216,239 B1
(45) Date of Patent: Feb. 4, 2025

(54) MAPPING METHOD OF LANDSLIDE THREAT RANGE BASED ON EQUIVALENT FRICTION COEFFICIENT AND TREND ANALYSIS

(71) Applicant: Institute of Geology and Geophysics, Chinese Academy of Sciences, Beijing (CN)

(72) Inventors: Xueliang Wang, Beijing (CN); Mengmeng Ban, Beijing (CN); Mengjie Zhang, Beijing (CN); Shengwen Qi, Beijing (CN); Lihui Li, Beijing (CN); Bowen Zheng, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/764,288

(22) Filed: Jul. 4, 2024

(30) Foreign Application Priority Data

Feb. 2, 2024 (CN) .......................... 202410145865.0

(51) Int. Cl.
 *G01V 20/00* (2024.01)
(52) U.S. Cl.
 CPC .................................. *G01V 20/00* (2024.01)
(58) Field of Classification Search
 None
 See application file for complete search history.

(56) References Cited

U.S. PATENT DOCUMENTS

2023/0168399 A1\* 6/2023 Yu .......................... G01V 20/00
                                                                    702/15

FOREIGN PATENT DOCUMENTS

| CN | 107609284 B | \* | 11/2020 |
| CN | 113221371 A | | 8/2021 |
| CN | 113408201 A | \* | 9/2021 |
| CN | 114359500 A | | 4/2022 |

(Continued)

OTHER PUBLICATIONS

CN114963961A translation (Year: 2022).\*

(Continued)

*Primary Examiner* — Lina Cordero
(74) *Attorney, Agent, or Firm* — Pilloff Passino & Cosenza LLP; Rachel Pilloff; Sean Passino

(57) ABSTRACT

Disclosed is a mapping method of landslide threat range based on equivalent friction coefficient and trend analysis, which includes the following steps: obtaining physical parameters of a landslide, and obtaining a volume of the landslide according to an area in the physical parameters; selecting relevant parameters based on a rock type in the physical parameters, and obtaining the equivalent friction coefficient according to the relevant parameters and the volume; obtaining a landslide runout distance according to the equivalent friction coefficient, determining coordinate points of a hyperbola and a front edge boundary range according to the landslide runout distance, and performing a hyperbolic fitting on two side boundaries of the landslide according to the coordinate points to obtain a side boundary range; generating the landslide threat range based on the front edge boundary range and the side boundary range.

7 Claims, 5 Drawing Sheets

(56) References Cited

FOREIGN PATENT DOCUMENTS

| | | | |
|---|---|---|---|
| CN | 114963961 A | * | 8/2022 |
| CN | 116504032 B | * | 9/2023 |

OTHER PUBLICATIONS

CN113408201A translation (Year: 2021).*
CN107609284B translation (Year: 2020).*
CN116504032B translation (Year: 2023).*
Wang Ran et al., Influence Factors and Characteristics of Apparent Friction Coefficient of Landslide Based on Statistical Analy-Sis and Numerical Simulation, Journal of engineering geology, Date of issue: Dec. 31, 2021. Full text Related claims: 1-8.
Xiaohui Liao et al., "Engineering Application and Prediction of the Influence Area of the Rockfall Hazards." Mathematical Problems in Engineering, Date of issue: May 7, 2020. Full text Related claims: 1-8.
First Office Action for China Application No. 202410145865.0, mailed Mar. 13, 2024.
Notification to Grant Patent for China Application No. 202410145865.0, mailed Apr. 1, 2024.
First Search Report for China Application No. 202410145865.0, dated Mar. 11, 2024.
Supplementary Search Report for China Application No. 202410145865.0, dated Mar. 26, 2024.

* cited by examiner

MAPPING METHOD OF LANDSLIDE THREAT RANGE BASED ON EQUIVALENT FRICTION COEFFICIENT AND TREND ANALYSIS

CROSS-REFERENCE TO RELEVANT APPLICATIONS

This application claims priority to Chinese Patent Application No. 202410145865.0, filed on Feb. 2, 2024, the contents of which are hereby incorporated by reference.

TECHNICAL FIELD

The application relates to the technical field of intelligent disaster prevention and mitigation of geological disasters, and in particular to a mapping method of landslide threat range based on equivalent friction coefficient and trend analysis.

BACKGROUND

The prediction of landslide runout range based on statistical methods mainly includes two aspects, namely, the prediction of the slip distance and the boundary of influence range. The slip distance represents the longitudinal migration distance of the landslide, and the boundary of the influence range represents the plane projection boundary of the landslide. The slip distance and the boundary of influence range are relevant to the failure form, scale, speed and runout time of landslides, and are the key parameters for landslide risk assessment and management.

However, at present, the relevant norms or guidance for landslide threat range analysis at home and abroad are limited. The landslide guide issued by the Association of Professional Engineers and Geoscientists in British Columbia (APEGBC 2010) describes the landslide migration analysis and relevant protective structure design as "specialty services", which indicates that the work may be beyond the scope of typical landslide assessment, or may require expert help, and the landslide guide only provides appropriate tools and methods for landslide maximum runout distance analysis. However, according to the special geological environment conditions of typical mountainous areas in southwest China, there is no automatic mapping technology for the boundary of landslide threat area at present, which makes it difficult to quantitatively assess the threat range of landslide disaster when planning land use and preventing and reducing landslide disaster. Therefore, it is urgent to establish an automatic mapping method of landslide threat range based on equivalent friction coefficient and trend analysis to support landslide disaster prevention and mitigation, emergency management and land use planning in mountainous areas.

SUMMARY

According to the present disclosure, the extraction results of geometric characteristics of regional landslides are combined, and the influencing factors such as area of the landslide, volume, average slope, maximum vertical falling height, rock type of slope materials and the like are further considered, and the relationship between the maximum vertical distance H and the maximum horizontal distance L of the landslide, the equivalent friction coefficient H/L and the landslide volume V, and the distribution laws of equivalent friction coefficients and volumes corresponding to different rock types of the landslides are data-mined by a statistical method, so that a landslide runout slippage prediction model is constructed based on the statistical method, and the automated mapping of the range of geohazard threats is realized.

In order to achieve the above objectives, the present application provides the following scheme:

A mapping method of a landslide threat range based on an equivalent friction coefficient and a trend analysis, including:

obtaining physical parameters of a landslide, and obtaining a volume of the landslide according to an area in the physical parameters;

selecting relevant parameters based on a rock type in the physical parameters, and obtaining the equivalent friction coefficient according to the relevant parameters and the volume;

obtaining a landslide runout distance according to the equivalent friction coefficient, determining coordinate points of a hyperbola and a front edge boundary range according to the landslide runout distance, and performing a hyperbolic fitting on two side boundaries of the landslide according to the coordinate points to obtain a side boundary range; and generating the landslide threat range based on the front edge boundary range and the side boundary range.

Optionally, obtaining the volume of the landslide includes:

checking whether significant differences exist between the physical parameters, performing a correlation analysis on checked physical parameters, constructing a relationship model between landslide area and volume, and inputting the area in the physical parameters into the area of the relationship model between landslide area and volume to obtain the volume of the landslide.

Optionally, a method for constructing the relationship model between landslide area and volume includes:

$$V = m \times A^n$$

where V is the volume of the landslide, A is the area of the landslide, m is a constant, and n is a constant.

Optionally, obtaining the equivalent friction coefficient includes:

constructing an exponential function relationship between the equivalent friction coefficient and the volume, and inputting the relevant parameters and the volume into the exponential function relationship to obtain the equivalent friction coefficient.

Optionally, a method for constructing the exponential function relationship includes:

$$H/L = a \times V^{-b}$$

where H/L is the equivalent friction coefficient, a and b are the relevant parameters, V is the volume, H is a maximum vertical distance of the landslide, and L is a maximum horizontal distance.

Optionally, a method of performing the hyperbolic fitting on the two side boundaries of the landslide includes:

$$(y - b) * \cos\theta - (x - a) * \sin\theta = \frac{[(x - a)\cos\theta + (y - b)\sin\theta]^2}{2p}$$

where a and b are translation quantities, y is an ordinate, θ is the expansion angle, x is an abscissa and p is a constant.

Optionally, determining the coordinate points of the hyperbola includes:

calculating a center of gravity of a source surface in the landslide, obtaining P1 coordinates of a top center point of the source surface, extending a first target distance from the P1 coordinates along a slip direction while being perpendicular to the slip direction, respectively extending a second target distance to both sides from the P1 coordinates to obtain a first endpoint coordinate and a second endpoint coordinate, extending to both sides according to an expansion angle from the first endpoint coordinate and the second endpoint coordinate, and intersecting with a vertical line segment to obtain P2 coordinates and P3 coordinates.

Optionally, determining the front edge boundary range includes:

based on the P1 coordinates, the P2 coordinates and the P3 coordinates, solving a boundary model to obtain a side boundary of a landslide runout range, constructing a circular model with a vertex of a parabola as a center of a circle and a predicted runout distance as a radius, and determining a front edge boundary of the landslide runout range through an inscribed part of the circular model and the parabola.

The method has the following beneficial effects.

According to the special geological environment conditions of mountainous areas in China, the threat range of landslide hidden dangers is rapidly predicted and automatically mapped, which may provide quantitative evaluation basis for landslide hazard zoning and provide strong support for urban landslide disaster prevention and mitigation and disaster emergency.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

In the following, the technical schemes in the embodiments of the application will be clearly and completely described with reference to the attached drawings. Obviously, the described embodiments form only a part of the embodiments of the application, but not the whole embodiments. Based on the embodiments in the present application, all other embodiments obtained by ordinary technicians in the field without creative labor belong to the scope of protection of the present application.

In order to make the above objectives, features and advantages of the present application more obvious and easier to understand, the present application will be further described in detail with the attached drawings and specific embodiments.

Figure 1:
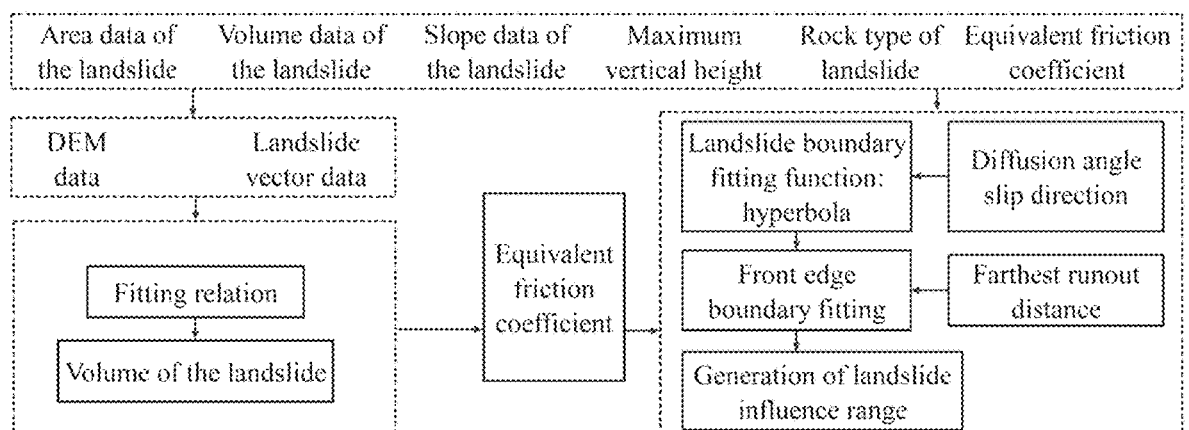
FIG. 1 is a schematic diagram of a mapping method of landslide threat range based on equivalent friction coefficient and trend analysis according to an embodiment of the present application.

As shown in FIG. 1, the application discloses a mapping method of landslide threat range based on equivalent friction coefficient and trend analysis, including the following steps.

The vector information of landslide source surface is obtained by remote sensing identification or InSAR interpretation, and the parameters of landslide source area, width, slip direction and rock type are extracted in batches based on ArcGIS software.

According to the volume-area formula, the volume V of landslide is calculated, and the calculation result is substituted into the shp file field, and the field is named as V.

The equivalent friction coefficient H/L and the slip distance L are calculated and the calculation result is substituted into the shp file field;

$$L=H/(H/L)=H/(a*V^{-b}).$$

The center of gravity of the source surface file is calculated, so as to obtain the P1 coordinates of the top center point of the source according to the calculation. Next, according to the slip direction, the distance L is extended along the slip direction from point P1. Then, perpendicular to the slip direction, starting from the top center point P1 of the source, extending a half of the width of the source to both sides respectively, and the coordinates of the end points E and F are obtained. Next, according to the expansion angle α, starting from the end points E and F, extending to both sides according to the expansion angle, intersecting with the vertical line L2 at points G and H, and the coordinates of points P2 and P3 are calculated.

The above-mentioned three points coordinates P1, P2 and P3 are substituted, the boundary trend line equation of landslide runout range may be solved. The drawn parabola and circle are converted into surface elements, and the intersection of them is taken, and finally the surface vector of landslide runout range is obtained.

Correlation analysis between landslide elements and equivalent friction coefficient includes:

based on the landslide interpretation, and based on ArcGIS platform, the histogram of each element feature is statistically analyzed. Statistical characteristics show that the area of the landslide runout zones from $1\times10^4$ $m^2$ to $1\times10^6$ $m^2$, with an average value of $4.15\times10^5$ $m^2$ and a standard deviation of 442,571 $m^2$. The average slope of the landslide runout zones from 9.5° to 44.4°, and 90% of the slopes are in the range of 20°<θ<42°. The maximum falling height difference of the landslide runout zones from 85 m to 1,416 m, and 90% of the slopes are in the range of 20°<θ<42°. The slip distance of landslide runout zones from 139.2 m to 4,420.2 m, and the average value and standard deviation are 1,032.7 m and 531.6 m respectively. The equivalent friction coefficient is mainly distributed between 0.2 and 0.8, and the average value and standard deviation are 0.55 and 0.15 respectively. The volume of the landslide is mainly distributed between $1\times10^5$ $m^3$ and $1\times10^7$ $m^3$.

The significance test includes:
before correlation analysis, the application firstly tests whether there are significant differences among various elements of landslide. When the statistical significance value P>0.05, the differences between the data are not statistically significant. According to the statistical principle, the invalid hypothesis may not be denied, but it is not considered that the invalid hypothesis is definitely established. P value in hypothesis testing is an important content in inference statistics. P value is probability, which reflects the probability of an event. The P value obtained according to the significance test method by statistics is generally statistically different when P<0.05, and it is significantly statistically different when P<0.01. The test results show that the significance values are all less than 0.01, so it is considered that there are significant differences among the elements, as shown in Table 1, which is the significance test among the elements of landslide.

TABLE 1

| Significance coefficient | Slope | Altitude difference | Migration distance | Equivalent friction coefficient | Volume |
|---|---|---|---|---|---|
| Slope | — | 9.E–04 | 4.E–08 | 4.E–79 | 4.E–05 |
| Altitude difference | 9.E–04 | — | 3.E–115 | 1.E–05 | 1.E–32 |
| Migration distance | 4.E–08 | 3.E–115 | — | 7.E–17 | 5.E–83 |
| Equivalent friction coefficient | 4.E–79 | 1.E–05 | 7.E–17 | — | 5.E–09 |
| Volume | 4.E–05 | 1.E–32 | 5.E–83 | 5.E–09 | — |

Figure 2:
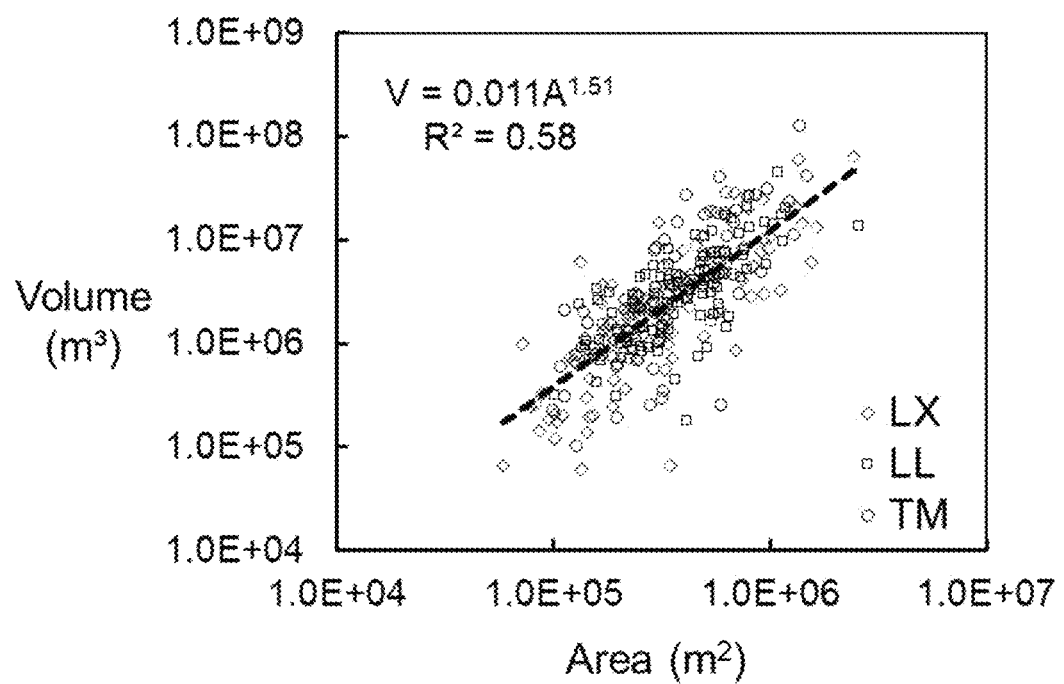
FIG. 2 is a correlation analysis diagram of area and volume of the landslide according to an embodiment of the present application.

Correlation Analysis Includes:
correlation analysis refers to the analysis of two or more variable elements with correlation, so as to measure the degree of correlation between the two factors. Correlation analysis may only be carried out if there is a certain connection or probability between the relevant elements. The most intuitive way to judge whether the data is relevant is to draw a scatter plot. The degree of unity of the two variables is measured by correlation coefficient, ranging from −1 to 1, where 1 stands for perfect positive correlation and −1 stands for perfect negative correlation. The greater the value of r coefficient, the stronger the predictive capability of linear regression equation. The square of the correlation coefficient is called the coefficient of determination, which is expressed by $r^2$, reflecting how much of the change of one variable is determined by the change of another variable, and is used to measure the degree of interpretation of y by the regression equation. The range of judgment coefficient: $0 \leq r^2 \leq 1$. The closer $r^2$ is to 1, the stronger the correlation between x and y; the closer $r^2$ is to 0, it shows that there is almost no linear correlation between the two variables.

$$r = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}$$

where n is the number of sample points, $(x_i, y_i)$ is the sample point, $\bar{x}$ is the mean value of variable x and $\bar{y}$ is the mean value of variable y.
The range of correlation coefficient is $-1 \leq r \leq 1$.
In order to further analyze the correlation between various factors, the volume (V) and the area (A) information of the landslide are drawn in a chart and expressed in log-log coordinates. The area A (x-axis) covers four orders of magnitude of landslides ($\sim \times 10^4$ m$^2$<A<$\sim \times 10^5$ m$^2$), and the volume V (y-axis) covers five orders of magnitude ($\sim \times 10^4$ m$^3$<V<$\sim \times 10^8$ m$^3$). The accuracy of each landslide measurement depends on the size of the landslide. There is an obvious linear relationship between the area A and the volume V in log-log coordinates, and this relationship spans several orders of magnitude (FIG. 2). This shows that there is self-similarity between the area and volume of landslide. The correlation coefficient is 0.58, and such a strong correlation shows that it is possible to convert other information into volume of the landslide, which is useful for the estimation of volume of the landslide. Based on the correlation between source area and volume, the area-volume power law relationship of a specific site may be constructed by unary regression analysis, and the area of the landslide may be obtained.

In order to establish an empirical relationship model between area and volume of the landslide, the data of area and volume of the landslide obtained in this area are fitted by equation $V = a \, A^b$. In this embodiment, the logarithmic transformation is carried out on the data, and the empirical formula of the relationship between area and volume of the landslide is obtained, that is, $H/L = a \times V^\gamma$. For the discreteness of data in the log-log coordinates, error analysis shows that the discreteness of empirical data around the trend line is controllable.

Then, Pearson correlation coefficients between the maximum vertical distance H, the migration distance L, the slope θ, the volume of the landslide V and the equivalent friction coefficient H/L of the landslide are calculated, as shown in Table 2 shows the correlation analysis of the landslide elements. It may be found that volume of the landslide has an important influence on landslide migration, and the equivalent friction coefficient of landslide is closely relevant to volume and slope of the landslide. In order to better predict the landslide migration range, this embodiment explores the V-H/L relationship.

TABLE 2

| Pearson coefficient | Slope | Altitude difference | Migration distance | Equivalent friction coefficient | Volume |
|---|---|---|---|---|---|
| Slope | 1 | 0.147 | −0.239 | 0.709 | −0.181 |
| Altitude difference | 0.147 | 1 | 0.8 | 0.192 | 0.492 |
| Migration distance | −0.239 | 0.8 | 1 | −0.358 | 0.721 |
| Equivalent friction coefficient | 0.709 | 0.192 | −0.358 | 1 | −0.256 |
| Volume | −0.181 | 0.492 | 0.721 | −0.256 | 1 |

Prediction of Landslide Influence Range Based on Trend Surface Analysis Includes:
1) Prediction of Landslide Runout Scale
The dependence between area and volume of the landslide is self-similar. There is an obvious linear relationship (in log-log coordinates) between AL and VL, and it is a relationship of several orders of magnitude. Different fitting methods, such as least square linear fitting, robust linear fitting, robust resistance regression and least square nonlinear fitting, are used for the data after logarithmic transformation, and the fitting results of different methods are very similar. This relationship is mainly geometric, and is not significantly affected by the geomorphological or mechanical properties of soil or rock or the type of landslide.

The scale of slope runout is distinguished according to the volume V of landslide, which is closely relevant to the area and depth of landslide. By establishing the relationship between volume V of the landslide and area ($V=m \times A^n$), the predicted value of volume of the landslide may be obtained by inputting area parameters.

2) Calculation of Equivalent Friction Coefficient

Equivalent friction coefficient is closely relevant to volume of the landslide, which is one of the key influencing factors of landslide. The research shows that there is an obvious exponential function relationship between the equivalent friction coefficient H/L of landslide and the volume V, and the equivalent friction coefficient decreases with the increase of volume of the landslide. The present application analyzes the correlation between the equivalent friction coefficient H/L and the volume V of the landslide. Taking the volume logarithm as the independent variable, the sample data is fitted through the established exponential function relationship, and the mathematical model relationship formula of the two elements is summarized and the confidence interval of the data is calculated. An example is the following formula, where a and b are fitting coefficients and V is volume of the landslide.

$$H/L = a \times V^{-b}$$

It is very important to determine the equivalent friction coefficient of landslide in the target area for generating the influence range of landslide. Through statistical methods, appropriate values of parameters a and b are selected (suggested range: $1.606 < a < 5.468$; $0.084 < b < 0.152$), and the equivalent friction coefficient of landslide is calculated by formula calculation method.

The prediction of landslide influence range based on trend analysis includes:

trend refers to the main body (or mainstream, general trend) of the development or change of things, which is not affected by local factors, but is dominated by the overall law. Generally speaking, geological variables have similar characteristics. Trend surface analysis is a mathematical analysis method that applies the principle of multiple regression analysis in mathematical statistics to divide geological variables (features) into regional variation components and local variation components, so as to study the spatial distribution and variation law of geological variables (features). Any geological variable may be regarded as the result of superposition of regional components and local components. The regional component of geological variables may reflect its overall trend in regional changes; the local component may reflect the local changes in a small range and is controlled by local factors.

Trend surface analysis is to find a mathematical surface according to the numerical value of a geological variable, to represent (or approximate or fit) the objective regional change of the geological variable, so as to find the regional change law (represented by trend surface diagram). In addition, the regional component of a geological variable may be removed, and the local component may be highlighted, so as to find and express local anomalies more clearly. The analysis of the above two aspects provides a mathematical basis for studying geological phenomena, and then achieves the purpose of prediction, which is the essence of trend surface analysis. By analyzing the trend value change of geological variables, the regional variation law of geological variables may be understood, and the reasons for its local anomalies may be understood by analyzing its local components.

The spatial distribution of most geological variables is regular. That is to say, there is objectively a surface that reflects the trend change of geological variables, and this spatial surface may generally be expressed by mathematical methods. Therefore, the same is true for the prediction of the influence range of landslide runout.

If the influence range of landslide runout is regarded as a dependent variable and the geographical coordinates of x and y in two-dimensional space are regarded as independent variables, the change of the influence range of landslide runout in two-dimensional space must be a surface, and a surface may be found to represent the general change trend through polynomial trend surface analysis. That is to say, polynomial function is used to fit or approximate the spatial trend change of landslide runout range. The method includes the following steps: firstly, carrying out trend analysis on the landslide boundary, further fitting the influence range of landslide runout through a curved surface function, and finally testing the result.

Figure 3:
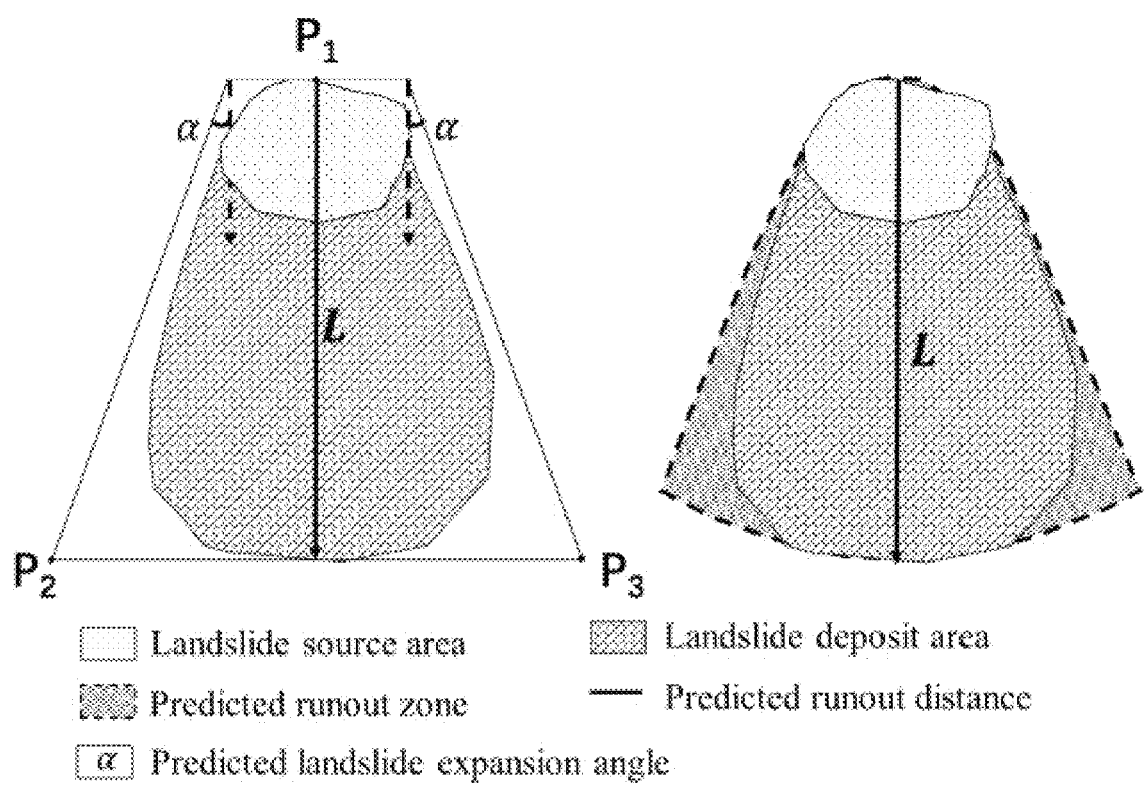
FIG. 3 is a schematic diagram of landslide runout range prediction according to an embodiment of the present application.

Landslide Boundary Prediction Based on Trend Line Analysis is as Shown in FIG. 3:

Taking the maximum height difference of landslide, volume of the landslide, width of landslide source area, landslide direction and diffusion angle as input, and the maximum horizontal runout distance of landslide as output, the range boundary is fitted on the basis of the original runout distance prediction, and the nonlinear mapping between influencing factors and landslide runout zone is realized. During the fitting process, it is found that the fitting result of parabola equation in hyperbola function is good, so parabola fitting is carried out on both sides of the boundary, and the fitting function equation is as follows:

$$(y-b)*\cos\theta - (x-a)*\sin\theta = \frac{[(x-a)\cos\theta + (y-b)\sin\theta]^2}{2p}$$

where x is the abscissa; y is the ordinate; $\theta$ is the expansion angle, which is set to 15°; p is a constant, and the $\theta$ angle is consistent with the slip direction of the landslide. According to the runout distance and diffusion angle of the landslide, the coordinates of three points on the hyperbola (P1, P2, P3) may be calculated and determined, and the boundary equation may be solved.

Determining the coordinates of the three points on the hyperbola includes: the center of gravity of the source surface file is calculated to obtain the P1 coordinates of the center point at the top of the source according to the calculation. Next, according to the slip direction, the distance L is extended along the slip direction from point P1. Then, perpendicular to the slip direction, starting from the top center point P1 of the source, half of the width of the source is extended to both sides respectively, and the coordinates of the end points E and F are obtained. Next, according to the expansion angle α, starting from the end points E and F, extending to both sides according to the expansion angle, intersecting with the vertical line L2 at points G and H, and the coordinates of points P2 and P3 are calculated.

The side boundary of the landslide runout range may be obtained through the above operation. The application takes the vertex of the parabola as the center of a circle and the predicted runout distance as the radius to deduce the equation of the circle, and defines the front edge boundary of the landslide runout range through the inscribed part of the circle and the parabola.

$$(x-a)^2 + (y-b)^2 = L^2$$

where L is the runout distance of landslide.

Based on this, the side boundary line and the front boundary line of the influence range of landslide runout are constructed, and the influence range boundary of landslide body in two dimensions is obtained, and finally the landslide threat range is generated.

The mapping method of landslide threat range based on equivalent friction coefficient and trend analysis includes:

in order to realize the rapid prediction of landslide runout range in regional scope, on the basis of the above research, the Add-ins plug-in for automatic recognition of landslide runout range based on statistical method is developed based on ArcGIS framework. Add-ins plug-ins may make it easier for users to customize and expand ArcGIS Desktop applications, and provide an open basic framework for the creation of custom tools. Meanwhile, Add-ins plug-ins do not need to install programs or register component models (COM), and may be easily shared among users.

Figure 4:
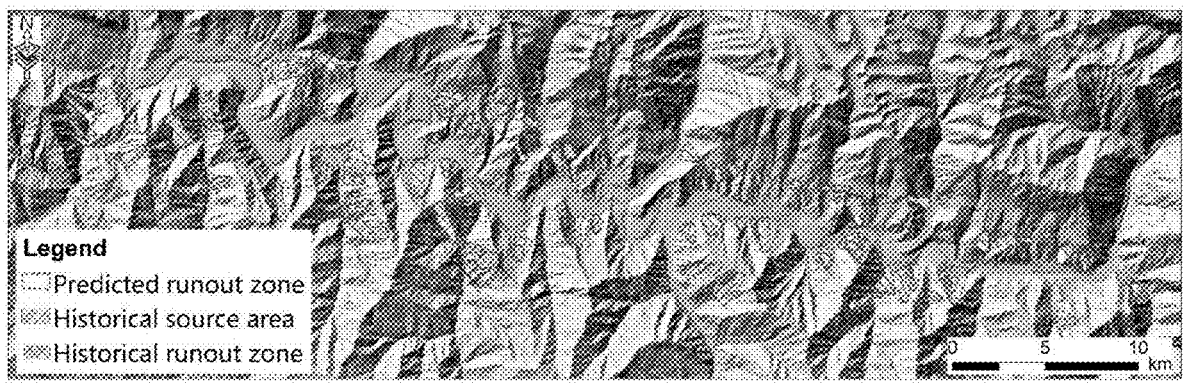
FIG. 4 is an automatic identification result of landslide statistical range based on statistics according to an embodiment of the present application.
Figure 5:
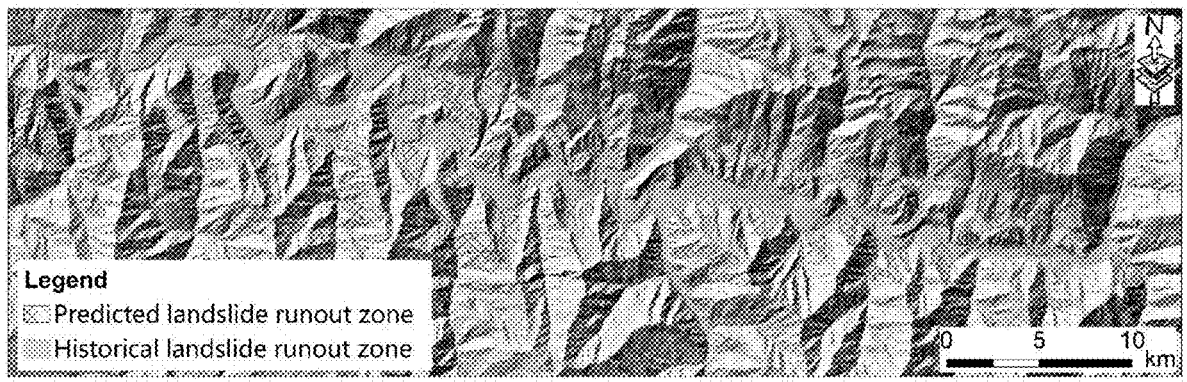
FIG. 5 is a comparison chart of landslide influence range prediction accuracy based on statistics according to an embodiment of the present application.

Taking the interpreted landslide in Langxian District as an example, the influence range of landslide is predicted based on statistical methods (FIG. 4). The light gray area represents the historical landslide source range, the dark gray area represents the historical landslide deposit range, and the colorless area box represents the prediction range. It is found that the prediction range may cover the landslide influence range well. Next, based on the ArcGIS platform, the application statistically analyzes the coverage of the prediction range to the actual influence range of landslide, and draws a comparison chart of landslide influence range accuracy based on statistics (FIG. 5). It is found that the average accuracy and standard deviation of the prediction results of landslide influence range based on statistics are 95% and 6.87%, which shows that the method is reliable.

The above-mentioned embodiment is only a description of the preferred mode of the application, and does not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. An automated mapping method for assessing and managing a landslide hazard zoning for urban landslide disaster prevention, mitigation and disaster emergency based on an equivalent friction coefficient and a trend analysis, comprising:
    obtaining vector information of a landslide source surface by remote sensing identification or InSAR interpretation, and extracting parameters of the landslide source surface including area, width, slip direction, and rock type in batches based on ArcGIS software;
    selecting relevant parameters based on the rock type in the parameters, and obtaining the equivalent friction coefficient according to the relevant parameters and a volume of the landslide source surface;
    obtaining a landslide runout distance according to the equivalent friction coefficient, determining coordinate points of a hyperbola and a front edge boundary range according to the landslide runout distance, and performing a hyperbolic fitting on two side boundaries of the landslide source surface according to the coordinate points to obtain a side boundary range;

wherein determining the coordinate points of the hyperbola comprises:
    calculating a center of gravity of the landslide source surface, obtaining P1 coordinates of a top center point of the landslide source surface, extending a first target distance from the P1 coordinates along the slip direction, while being perpendicular to the slip direction, respectively extending a second target distance to both sides from the P1 coordinates to obtain a first endpoint coordinate and a second endpoint coordinate, extending to both sides according to an expansion angle from the first endpoint coordinate and the second endpoint coordinate, and intersecting with a vertical line segment to obtain P2 coordinates and P3 coordinates; and
    generating the landslide hazard zoning based on the front edge boundary range and the side boundary range.

2. The automated mapping method according to claim 1, wherein obtaining the volume of the landslide source surface comprises:
    checking whether differences exist between the parameters, performing a correlation analysis on checked parameters, constructing a relationship model between landslide area and volume, and inputting the area in the parameters into the relationship model between landslide area and volume to obtain the volume of the landslide source surface.

3. The automated mapping according to claim 2, wherein a method for constructing the relationship model between landslide area and volume comprises: $V = m \times A^n$ wherein V is the volume of the landslide source surface, A is the area of the landslide source surface, m is a first constant, and n is a second constant.

4. The automated mapping method according to claim 1, wherein obtaining the equivalent friction coefficient comprises:
    constructing an exponential function relationship between the equivalent friction coefficient and the volume, and inputting the relevant parameters and the volume into the exponential function relationship to obtain the equivalent friction coefficient.

5. The automated mapping method according to claim 4, wherein a method for constructing the exponential function relationship comprises: $H/L = a \times V^{-b}$ wherein H/L is the equivalent friction coefficient, a and b are the relevant parameters, V is the volume, H is a maximum vertical distance of the landslide source surface, and L is a maximum horizontal distance.

6. The automated mapping method according to claim 1, wherein a method of performing the hyperbolic fitting on the two side boundaries of the landslide source surface comprises:

$$(y-b)*\cos\theta - (x-a)*\sin\theta = \frac{[(x-a)\cos\theta + (y-b)\sin\theta]^2}{2p}$$

wherein a and b are translation quantities, y is an ordinate, θ is the expansion angle, x is an abscissa and p is a constant.

7. The automated mapping method according to claim 1, wherein determining the front edge boundary range comprises:
    based on the P1 coordinates, the P2 coordinates and the P3 coordinates, solving a boundary model to obtain a side boundary of a landslide runout range, constructing a circular model with a vertex of a parabola as a center of a circle and a predicted runout distance as a radius, and determining a front edge boundary of the landslide runout range through an inscribed part of the circular model and the parabola.

\* \* \* \* \*